(12) United States Patent
Tani

(10) Patent No.: US 11,434,351 B2
(45) Date of Patent: Sep. 6, 2022

(54) RUBBER COMPOSITION AND TIRE

(71) Applicant: OTSUKA CHEMICAL CO., LTD., Osaka (JP)

(72) Inventor: Masato Tani, Tokushima (JP)

(73) Assignee: OTSUKA CHEMICAL CO., LTD., Osaka (JP)

( * ) Notice: Subject to any disclaimer, the term of this patent is extended or adjusted under 35 U.S.C. 154(b) by 221 days.

(21) Appl. No.: 16/629,382

(22) PCT Filed: Jul. 9, 2018

(86) PCT No.: PCT/JP2018/025806
§ 371 (c)(1),
(2) Date: Jan. 8, 2020

(87) PCT Pub. No.: WO2019/013145
PCT Pub. Date: Jan. 17, 2019

(65) Prior Publication Data
US 2020/0148862 A1 May 14, 2020

(30) Foreign Application Priority Data
Jul. 12, 2017 (JP) .............................. JP2017-136133

(51) Int. Cl.
| | | |
|---|---|---|
| *C08K 3/04* | (2006.01) | |
| *C08L 9/06* | (2006.01) | |
| *B60C 1/00* | (2006.01) | |
| *C08K 3/22* | (2006.01) | |
| *C08K 3/36* | (2006.01) | |
| *C08K 9/06* | (2006.01) | |

(52) U.S. Cl.
CPC .............. *C08L 9/06* (2013.01); *B60C 1/0016* (2013.01); *C08K 3/04* (2013.01); *C08K 3/22* (2013.01); *C08K 3/36* (2013.01); *C08K 9/06* (2013.01); *C08K 2003/2237* (2013.01); *C08K 2201/003* (2013.01); *C08K 2201/006* (2013.01)

(58) Field of Classification Search
CPC .......... B60C 1/0016; C08K 3/04; C08K 3/22; C08K 3/36; C08K 9/06; C08K 2003/2237; C08K 2201/003; C08K 2201/006
See application file for complete search history.

(56) References Cited

U.S. PATENT DOCUMENTS

| | | |
|---|---|---|
| 6,342,560 B1 | 1/2002 | Okel |
| 6,420,456 B1 | 7/2002 | Koski |
| 2005/0277717 A1 | 12/2005 | Joshi et al. |
| 2006/0148955 A1 | 7/2006 | Guiselin et al. |
| 2008/0027166 A1 | 1/2008 | Hochi et al. |
| 2011/0319519 A1 | 12/2011 | Sone et al. |
| 2015/0038643 A1 | 2/2015 | Hishikawa et al. |
| 2019/0063535 A1 | 2/2019 | Mitsumoto |

FOREIGN PATENT DOCUMENTS

| | | |
|---|---|---|
| CN | 101113217 A | 1/2008 |
| CN | 102348748 A | 2/2012 |
| CN | 103881161 A | 6/2014 |
| CN | 104220447 A | 12/2014 |
| CN | 105199171 A | 12/2015 |
| CN | 105384979 A | 3/2016 |
| CN | 106015411 A | 10/2016 |
| JP | 2001-527599 A | 12/2001 |
| JP | 2003-507521 A | 2/2003 |
| JP | 2003-165871 A | 6/2003 |
| JP | 2004-175991 A | 6/2004 |
| JP | 2004-204099 A | 7/2004 |
| JP | 2005-533140 A | 11/2005 |
| JP | 2008-522012 A | 6/2008 |
| JP | 2008303334 A | 12/2008 |
| JP | 2009-96934 A | 5/2009 |
| JP | 2010-208923 A | 9/2010 |
| JP | 2010-248450 A | 11/2010 |
| JP | 2011-079882 A | 4/2011 |
| JP | 2013-213144 A | 10/2013 |
| JP | 2015-071717 A | 4/2015 |
| JP | 2017-2186 A | 1/2017 |
| JP | 2017132829 A | 8/2017 |
| JP | 2017-161824 A | 9/2017 |
| WO | 01/12734 A1 | 2/2001 |

OTHER PUBLICATIONS

Extended European Search Report dated Mar. 9, 2021, issued in counterpart European Application No. 18831784.6 (in English; 6 pages).
Third-Party Submission of Patents or Publications, dated Jun. 21, 2021, received in counterpart Japanese Application No. 2019-529121 (2 pages; w/ English machine translation).
Office Action dated May 11, 2021, issued in counterpart Japanese Application No. 2019-529121 (w/ English machine translation; 6 pages).
International Search Report dated Sep. 11, 2018, issued in counterpart application No. PCT/JP2018/025806 (2 pages).
Written Opinion dated Sep. 11, 2018, issued in counterpart application No. PCT/JP2018/025806 (4 pages).
Notification of Transmillal of Translation of the International Preliminary Report on Patentabililty (Form PCT/IB/338) issued in counterpart International Application No. PCT/JP2018/025806 dataed Jan. 23, 2020 with Forms PCT/IB/373 and PCT/ISA/237 (7 pages).
Office Action dated Sep. 9, 2021, issued in counterpart Chinese Application No. 201880044814.1 (w/ English translation; 13 pages).

*Primary Examiner* — Edward J Cain
(74) *Attorney, Agent, or Firm* — WHDA, LLP

(57) ABSTRACT

Provided is a rubber composition containing non-fibrous titanate compound particles and having excellent dispersibility of the titanate compound particles and excellent wet grip performance and wear resistance. A rubber composition containing a rubber component mixed with: non-fibrous titanate compound particles having an average particle diameter of less than 30 μm and a BET specific surface area of 2 m²/g or more; and silica particles having a BET specific surface area of 50 to 250 m²/g.

8 Claims, 1 Drawing Sheet

[FIG. 1]
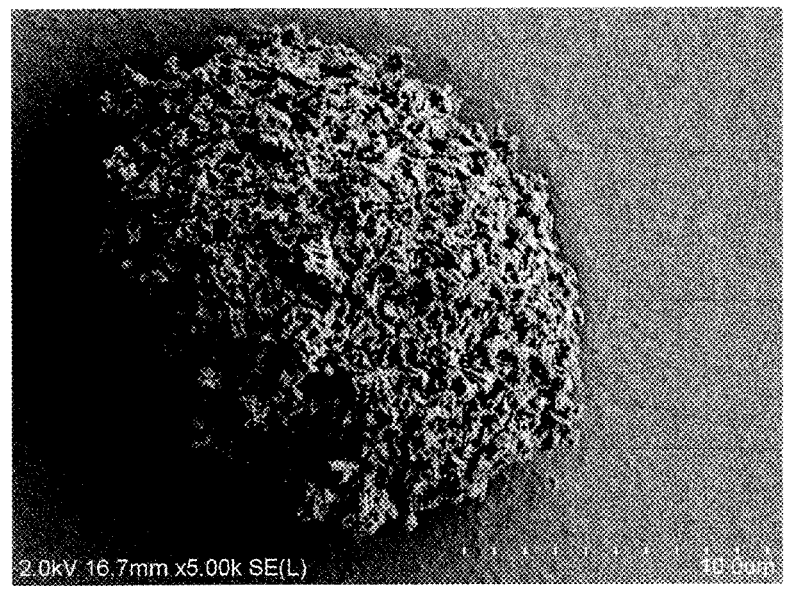
[FIG. 2]
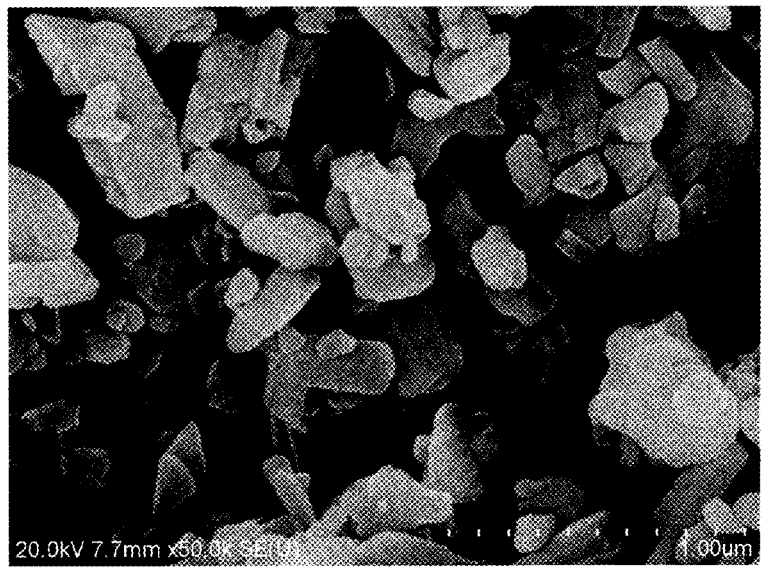

RUBBER COMPOSITION AND TIRE

TECHNICAL FIELD

The present invention relates to rubber compositions containing titanate compound particles as a filler and tires using the rubber compositions.

BACKGROUND ART

When a motor vehicle runs on a wet road surface in rainy weather, water intervenes between the tires and the road surface, which decreases the grip performance of the tires to increase the braking distance upon breakage. In order to increase the above wet grip performance, various studies to mix a filler into a rubber component are conducted. For example, Patent Literature 1 discloses a rubber composition for a tire tread containing a rubber component mixed with 1 to 30 parts by mass of potassium titanate fibers having an average fiber length of 1 to 30 μm.

Meanwhile, a phenolic resin composition containing potassium titanate fibers is known to be used as a friction material for a brake. Particularly, potassium titanate fibers are used as a friction modifier. However, many types of potassium titanate fibers have an average fiber diameter of 0.1 to 0.5 μm and an average fiber length of 10 to 20 μm and therefore include WHO fibers (fibrous particles having a length of 5 μm or more, a breadth of 3 μm or less, and an aspect ratio of 3 or more) defined by the World Health Organization (WHO). For this reason, the mixing of non-fibrous titanate compound particles as a friction modifier is prevalent.

CITATION LIST

Patent Literature

[PTL 1] JP-A-2004-175991

SUMMARY OF INVENTION

Technical Problem

The rubber composition in Patent Literature 1 uses fibrous titanate compound particles and has insufficient wet grip performance and insufficient dispersibility of titanate compound particles. Furthermore, it is not known to mix non-fibrous titanate compound particles into a rubber component in anticipation of their function as a friction modifier and use the mixture for tires.

An object of the present invention is to provide a rubber composition containing non-fibrous titanate compound particles and having excellent dispersibility of the titanate compound particles and excellent wet grip performance and wear resistance and also provide a tire using the rubber composition.

Solution to Problem

The present invention provides the following rubber composition and the following tire using the same.

Aspect 1: A rubber composition containing a rubber component mixed with: non-fibrous titanate compound particles having an average particle diameter of less than 30 μm and a BET specific surface area of 2 m$^2$/g or more; and silica particles having a BET specific surface area of 50 to 250 m$^2$/g.

Aspect 2: The rubber composition according to aspect 1, wherein a titanate compound formed into the non-fibrous titanate compound particles is at least one selected from a compound having a composition formula $A_2Ti_nO_{(2n+1)}$ [where A represents at least one metal selected from among alkali metals and n=2 to 8], a compound having a composition formula $R_xM_yTi_{(2-y)}O_4$ [where R represents an alkali metal other than lithium, M represents at least one element selected from lithium, magnesium, zinc, nickel, copper, iron, aluminum, gallium, and manganese, x=0.5 to 1.0, and y=0.25 to 1.0], a compound having a composition formula $K_{0.5-0.8}Li_{0.27}Ti_{1.73}O_{3.85-3.95}$, and a compound having a composition formula $K_{0.2-0.8}Mg_{0.4}Ti_{1.6}O_{3.7-3.95}$.

Aspect 3: The rubber composition according to aspect 1 or 2, wherein a treated layer made of a surface treatment agent is provided on a surface of each of the non-fibrous titanate compound particles.

Aspect 4: The rubber composition according to any one of aspects 1 to 3, wherein the rubber component is a diene rubber.

Aspect 5: The rubber composition according to any one of aspects 1 to 4, wherein an amount of the non-fibrous titanate compound particles mixed is 1 to 200 parts by mass relative to 100 parts by mass of the rubber component.

Aspect 6: The rubber composition according to any one of aspects 1 to 5, wherein an amount of the silica particles mixed is 20 to 120 parts by mass relative to 100 parts by mass of the rubber component.

Aspect 7: The rubber composition according to any one of aspects 1 to 6, wherein the rubber component is further mixed with carbon black particles.

Aspect 8: The rubber composition according to any one of aspects 1 to 7, being for use in a tire tread.

Aspect 9: A tire having a tread portion in which the rubber composition according to any one of aspects 1 to 8 is used.

Advantageous Effects of Invention

The present invention enables provision of a rubber composition containing non-fibrous titanate compound particles and having excellent dispersibility of the titanate compound particles and excellent wet grip performance and wear resistance and a tire using the rubber composition.

BRIEF DESCRIPTION OF DRAWINGS

FIG. 1 is a scanning electron micrograph showing a titanate compound particle in Production Example 1.

FIG. 2 is a scanning electron micrograph showing a titanate compound particle in Production Example 2.

DESCRIPTION OF EMBODIMENTS

Hereinafter, a description will be given of a preferred embodiment. However, the following embodiment is merely illustrative and the present invention is not limited to the following embodiment.

A rubber composition according to the present invention contains a rubber component mixed with: non-fibrous titanate compound particles (hereinafter occasionally abbreviated as titanate compound particles) having an average particle diameter of less than 30 μm and a BET specific surface area of 2 m$^2$/g or more; and silica particles having a BET specific surface area of 50 to 250 m$^2$/g. As necessary, the rubber composition can further contain another or other materials. According to the present invention, a rubber composition that contains titanate compound particles exhibiting excellent dispersibility during preparation of the rubber composition and in the rubber composition after the preparation and has excellent wet grip performance and wear resistance and a tire using the rubber composition can be provided. Furthermore, because the non-fibrous titanate compound particles are used in the rubber composition, the abrasion powder of the tire does not contain fibrous products derived from the titanate compound particles.

Although no particular limitation is placed on the rubber component for use in the rubber composition according to the present invention, a diene rubber is preferably used in light of its excellent strength. Examples of the diene rubber include natural rubber (NR), isoprene rubber (IR), styrene-butadiene rubber (SBR), butadiene rubber (BR), butyl rubber (IIR), ethylene-propylene-diene rubber (EPDM), acrylonitrile-butadiene rubber (NBR), styrene-isoprene-butadiene rubber (SIBR), and chloroprene rubber (CR) and a rubber component containing at least one of these diene rubbers is preferred. In light of the balance between low rolling resistance and high wet grip performance, the use of styrene-butadiene rubber (SBR) or butadiene rubber (BR) is more preferred. The mixture ratio (SBR/BR) between styrene-butadiene rubber (SBR) and butadiene rubber (BR) is preferably 60/40 to 100/0.

The type of titanate compound particles for use in the present invention may be arbitrary one appropriately selected from among known types of titanate compound particles, so long as they have an average particle diameter of less than 30 μm and a BET specific surface area of 2 m$^2$/g or more and are particles in a non-fibrous shape (non-fibrous particles), including spherical, lamellar, platy, bar-like, rod-like, columnar, blocky, porous, and shapes with multiple projections (such as amoeboid, boomerang-like, cross, and konpeito-like). The shape of the titanate compound particles can be analyzed, for example, by observation with a scanning electron microscope.

Fibrous particles in the present invention refer to particles in which L/T and L/B are 5 or more where L represents a length which is the longest side of, among cuboids (circumscribing cuboids) circumscribing the particle, a cuboid having the minimum volume, B represents a breadth which is the second longest side of the cuboid, and T represents a thickness which is the shortest side of the cuboid (provided, however, that B>T). Non-fibrous particles refer to particles other than fibrous particles and refer to particles in which L/B is less than 5 where L represents a length which is the longest side of, among cuboids (circumscribing cuboids) circumscribing the particle, a cuboid having the minimum volume, B represents a breadth which is the second longest side of the cuboid, and T represents a thickness which is the shortest side of the cuboid (provided, however, that B>T).

The term "with multiple projections" herein means that the shape of particles projected onto a plane is different at least from a normal polygon, circle, ellipse, and so on, and the particles are those that can take on a shape having projections in two or more directions, or have a so-called irregular shape. More specifically, the shape with projections is portions corresponding to portions projected from a polygon, circle, ellipse or the like (i.e., a basic shape) applied to a photograph (projected figure) captured by a scanning electron microscope (SEM).

The average particle diameter of the titanate compound particles for use in the present invention is less than 30 μm, preferably not less than 0.1 μm, more preferably not less than 0.6 μm, preferably not more than 3 μm, more preferably not more than 1.5 μm, and still more preferably not more than 1 μm. By adjusting the average particle diameter within the above range, more excellent dispersibility, wet grip performance, and wear resistance can be achieved.

The average particle diameter of the titanate compound particles can be measured by the laser diffraction and scattering method and is a particle diameter at a cumulative integrated value of 50% in a particle size distribution measured by the laser diffraction and scattering method (a volume-based 50% cumulative particle diameter), i.e., $D_{50}$ (a median diameter). This volume-based 50% cumulative particle diameter ($D_{50}$) is a particle diameter at a cumulative value of 50% in a cumulative curve of a particle size distribution determined on a volume basis, the cumulative curve assuming the total volume of particles to be 100%, where during accumulation the number of particles is counted from a smaller size side.

The BET specific surface area of the titanate compound particles for use in the present invention is 2 m$^2$/g or more, preferably 2 to 300 m$^2$/g, and more preferably 7 to 100 m$^2$/g. By adjusting the BET specific surface area within the above range, more excellent dispersibility, wet grip performance, and wear resistance can be achieved. The BET specific surface area of the titanate compound particles can be measured in conformity with JIS Z8830. The BET method refers to a method in which nitrogen gas whose occupied area has already been known is adsorbed on the surface of a sample powder particle and the specific surface area of the sample powder particle is determined from the amount of nitrogen gas adsorbed thereon, and the specific surface area determined by this method refers to the "BET specific surface area".

A titanate compound formed into the titanate compound particles for use in the present invention is preferably a salt of at least one element selected from the group consisting of alkali metals and alkaline earth metals. The alkali metals include lithium, sodium, potassium, rubidium, cesium, and francium and preferred alkali metals are lithium, sodium, and potassium. The alkaline earth metals include beryllium, magnesium, calcium, strontium, barium, and radium and preferred alkaline earth metals are magnesium and calcium.

Specific examples of the above titanate compound include respective titanate compounds expressed in a composition formula $A_2Ti_nO_{(2n+1)}$ [where A represents at least one metal selected from among alkali metals and n=2 to 8], a composition formula $R_xM_yTi_{(2-y)}O_4$ [where R represents an alkali metal other than lithium, M represents at least one element selected from lithium, magnesium, zinc, nickel, copper, iron, aluminum, gallium, and manganese, x=0.5 to 1.0, and y=0.25 to 1.0], a composition formula $K_{0.5-0.8}Li_{0.27}Ti_{1.73}O_{3.85-3.95}$, and a composition formula $K_{0.2-0.8}Mg_{0.4}Ti_{1.6}O_{3.7-3.95}$. These titanate compounds may be used singly or in combination of two or more thereof. Preferred among them are titanate compounds expressed in the composition formula $A_2Ti_nO_{(2n+1)}$ [where A represents at least one metal selected from among alkali metals and n=2 to 8], which have a tunnel crystal structure, and specific examples include $Na_2Ti_6O_{13}$, $Na_2Ti_8O_{17}$, $K_2Ti_6O_{13}$, and $K_2Ti_8O_{17}$. Since the titanate compound has a tunnel structure, the elution of alkali from the titanate compound can be further reduced.

The titanate compound particles preferably have an aqueous dispersion pH of 7 to 11. By adjusting the aqueous dispersion pH of the titanate compound particles within the above rage, the decrease in wear resistance due to acidic impurities contained in the titanate compound particles can be further reduced. The term aqueous dispersion pH in the present invention refers to the pH of a 1% by mass slurry obtained by dispersing titanate compound particles into water at 20° C.

The titanate compound particles for use in the present invention preferably each have a treated layer made of a surface treatment agent formed on the surface thereof, for the purposes of further increasing dispersibility, further increasing adhesion to the rubber component, and so on. Examples of the surface treatment agent include coupling agents, including a titanate coupling agent, a silane coupling agent, an aluminate coupling agent, and a zirconium coupling agent and, among them, a titanate coupling agent, a silane coupling agent, and an aluminate coupling agent are preferred. These coupling agents may be used singly or in a mixture of two or more thereof.

Examples of the titanate coupling agent include isopropyltristearoyl titanate, isopropyl tris(dioctylpyrophosphate) titanate, isopropyl tri(N-aminoethyl-aminoethyl) titanate, tetraoctyl bis(ditridecylphosphate) titanate, tetra(2-2-diallyloxymethyl-1-butyl)bis(ditridecyl)phosphate titanate, bis(dioctylpyrophosphate)oxyacetate titanate, and bis(dioctylpyrophosphate)ethylene titanate. Preferred among them is isopropyl tri(N-aminoethyl-aminoethyl) titanate.

Examples of the silane coupling agent include sulfide-based, polysulfide-based, thioester-based, thiol-based, olefin-based epoxy-based, amino-based, and alkyl-based silane coupling agents. These silane coupling agents may be used singly or in a mixture of two or more of them. Preferred among them are sulfide-based silane coupling agents and amino-based silane coupling agents.

Examples of the sulfide-based silane coupling agent include bis[3-(triethoxysilyl)propyl] tetrasulfide, bis[3-(trimethoxysilyl)propyl] tetrasulfide, bis[3-(methyldimethoxysilyl)propyl] tetrasulfide, bis(2-triethoxysilylethyl) tetrasulfide, bis[3-(triethoxysilyl)propyl] disulfide, bis[3-(trimethoxysilyl)propyl] disulfide, bis(3-methyldimethoxysilylpropyl) disulfide, bis(2-triethoxysilylethyl) disulfide, bis[3-(triethoxysilyl)propyl] trisulfide, bis[3-(trimethoxysilyl)propyl] trisulfide, bis(3-methyldimethoxysilylpropyl) trisulfide, bis(2-triethoxysilylethyl) trisulfide, bis(3-monoethoxydimethylsilylpropyl) tetrasulfide, bis(3-monoethoxydimethylsilylpropyl) trisulfide, bis(3-monoethoxydimethylsilylpropyl) disulfide, bis(3-monomethoxydimethylsilylpropyl) tetrasulfide, bis(3-monomethoxydimethylsilylpropyl) trisulfide, bis(3-monomethoxydimethylsilylpropyl) disulfide, bis(2-monoethoxydimethylsilylethyl) tetrasulfide, bis(2-monoethoxydimethylsilylethyl) trisulfide, and bis(2-monoethoxydimethylsilylethyl) disulfide. Preferred among them is bis[3-(triethoxysilyl)propyl] tetrasulfide.

Examples of the thioester-based silane coupling agent include 3-hexanoylthiopropyltriethoxysilane, 3-octanoylthiopropyltriethoxysilane, 3-decanoylthiopropyltriethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethoxysilane, 2-decanoylthioethyltrimethoxysilane, and 2-lauroylthioethyltrimethoxysilane.

Examples of the thiol-based silane coupling agent include 3-mercaptopropyltrimethoxysilane, 3-mercaptopropyltriethoxysilane, and 3-mercaptopropylmethyldimethoxysilane.

Examples of the olefin-based silane coupling agent include dimethoxymethylvinylsilane, vinyltrimethoxysilane, dimethylethoxyvinylsilane, diethoxymethylvinylsilane, triethoxyvinylsilane, vinyl tris(2-methoxyethoxy)vinylsilane, allyltrimethoxysilane, allyltriethoxysilane, p-styryltrimethoxysilane, 3-(methoxydimethoxydimethylsilyl)propyl acrylate, 3-(trimethoxysilyl)propyl acrylate, 3-[dimethoxy(methyl)silyl]propyl methacrylate, 3-(trimethoxysilyl)propyl methacrylate, 3-[dimethoxy(methyl)silyl]propyl methacrylate, 3-(triethoxysilyl)propyl methacrylate, and 3-[tris(trimethylsiloxy)silyl]propyl methacrylate.

Examples of the epoxy-based silane coupling agent include 3-glycidyloxypropyl(dimethoxy)methylsilane, 3-glycidyloxypropyltrimethoxysilane, diethoxy(3-glycidyloxypropyl)methylsilane, triethoxy(3-glycidyloxypropyl)silane, and 2-(3,4-epoxycyclohexyl)ethyltrimethoxysilane.

Examples of the amino-based silane coupling agent include N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-ethoxysilyl-N-(1,3-dimethylbutylidene)propylamine, N-phenyl-3-aminopropyltrimethoxysilane, and N-(vinylbenzyl)-2-aminoethyl-3-aminopropyltrimethoxysilane. Preferred among them is 3-aminopropyltriethoxysilane.

Examples of the alkyl-based silane coupling agent include methyltrimethoxysilane, dimethyldimethoxysilane, trimethylmethoxysilane, methyltriethoxysilane, ethyltrimethoxysilane, n-propyltrimethoxysilane, isobutyltrimethoxysilane, isobutyltriethoxysilane, n-hexyltrimethoxysilane, n-hexyltriethoxysilane, cyclohexylmethyldimethoxysilane, n-octyltriethoxysilane, and n-decyltrimethoxysilane.

Among these silane coupling agents, bis[3-(triethoxysilyl)propyl] tetrasulfide and 3-aminopropyltriethoxysilane can be particularly preferably used.

Examples of the aluminate coupling agent include acetoalkoxyaluminum diisopropylate, aluminum diisopropoxymonoethylacetoacetate, aluminum trisethylacetoacetate, and aluminum trisacetylacetonate. Preferred among them is acetoalkoxyaluminum diisopropylate.

Examples of the zirconate coupling agent include zirconium tetrakisacetylacetonate, zirconium dibutoxybisacetylacetonate, zirconium tetrakisethylacetoacetate, zirconium tributoxymonoethylacetoacetate, and zirconium tributoxyacetylacetonate.

Known surface treatment methods can be used as a method for forming a treated layer made of a surface treatment agent on the surface of each of the titanate compound particles. Examples of the methods that can be used include: a wet method of dissolving the surface treatment agent in a solvent capable of promoting hydrolysis (for example, water, an alcohol or a mixed solvent of them) to prepare a solution and spraying the solution on the titanate compound particles; and an integral blend method of blending the titanate compound particles and the surface treatment agent into the resin component.

No particular limitation is placed on the amount of surface treatment agent in treating the surfaces of the titanate compound particles according to the present invention with the surface treatment agent, but, in the case of the wet method, the solution of the surface treatment agent may be sprayed so that the amount of surface treatment agent reaches 0.1 to 20 parts by mass and preferably 0.1 to 10 parts by mass relative to 100 parts by mass of titanate compound particles. On the other hand, in the case of the integral blend method, the surface treatment agent may be blended into the rubber component so that the amount of surface treatment agent preferably reaches 1 to 50 parts by mass and more preferably 10 to 40 parts by mass relative to 100 parts by mass of titanate compound particles. By adjusting the amount of surface treatment agent within the above ranges, the adhesion of the titanate compound particles to the rubber component can increase to further improve the dispersibility of the titanate compound particles.

There is no particular limitation as to the method for producing the titanate compound particles for use in the present invention so long as the above-described composition and characteristics can be obtained. For example, the titanate compound particles can be produced by subjecting porous titanate compound particles, which have been obtained by bonding crystal grains of a titanate compound together by sintering and/or melting or so on and of which the cumulative pore volume in a pore diameter range of 0.01 to 1.0 μm is 5% or more, to dry grinding processing or wet grinding processing in a known method and, if necessary, further subjecting them to dry classification processing or wet classification processing, thus adjusting the average particle diameter and the specific surface area. The reason why the above porous titanate compound particles are ground is that non-fibrous fine particles can be easily produced. Furthermore, since the particles used are porous titanate compound particles obtained by bonding fine titanate compound particles together by sintering and/or melting or so on, it can be considered that the shear force during kneading of the rubber composition makes the porous titanate compound particles finer, so that the titanate compound particles are homogeneously dispersed into the rubber composition.

The cumulative pore volume of the above porous titanate compound particles is preferably 10% or more and more preferably 15% or more. The upper limit of the cumulative pore volume is preferably 40% and more preferably 30%. If the cumulative pore volume is too small, fine particles may be difficult to produce. If the cumulative pore volume is too large, the bonded portions between the crystal grains of the porous titanate compound particles may be weak, so that their porous structure may not be able to be maintained. The cumulative pore volume can be measured by mercury porosimetry.

The BET specific surface area of the porous titanate compound particles is preferably in a range of 1 to 13 $m^2/g$ and more preferably in a range of 3 to 9 $m^2/g$. If the BET specific surface area is too small, fine particles may be difficult to produce. If the BET specific surface area is too large, the chemical reaction during the firing process may not be completed.

The particle shape of the porous titanate compound particles is preferably a powdered shape, such as spherical or amorphous shape, and more preferably a non-fibrous shape. The particularly preferred shape is spherical.

Although there is no particular limitation as to the particle size of the porous titanate compound particles, their average particle diameter is preferably 5 to 500 μm, more preferably 10 to 300 μm, and still more preferably 20 to 100 μm. These various kinds of particle shapes and particle sizes can be arbitrarily controlled depending on production conditions, particularly, the composition of source materials, firing conditions, grinding processing conditions, and so on.

There is no particular limitation as to the method for producing the porous titanate compound particles so long as the above-described characteristics can be obtained. An example that can be cited is a method of mechanically grinding a source of titanium and a source of alkali metal to obtain a ground mixture and subjecting the ground mixture to dry granulation and then firing to produce porous titanate compound particles.

An example of the mechanical grinding is a method of grinding the source materials while making a physical impact on them. A specific example is grinding in a vibration mill. It can be considered that when grinding processing in a vibration mill is performed, shear stress produced due to frictional grinding of the powder mix concurrently causes a disorder of the atomic arrangement and a decrease in interatomic distance, so that atom transfer occurs at contact points between heterogeneous particles, resulting in the formation of a metastable phase. Thus, a ground mixture having high reaction activity is obtained, so that the firing temperature to be described hereinafter can be lowered and an unreacted product can be reduced even if the ground mixture is granulated. In order to efficiently apply shear stress to the source materials, the mechanical grinding is preferably performed by dry processing in which neither water nor solvent is used.

There is no particular limitation as to the processing time for the mechanical grinding, but it is generally preferably in a range of 0.1 to 2 hours.

The granulation of the ground mixture is performed by dry granulation in which neither water not solvent is used. The dry granulation can be performed by known methods and examples include tumbling granulation, fluidized bed granulation, and agitation granulation. Wet granulation is not preferred because vaporization of a liquid substance inside a granulated material during the process of drying the granulated material results in the provision of porous particles having large cavities thereinside and the powder strength is thus decreased. In addition, the application of heat to the granulated material is necessary for vaporization of water and solvent, which results in poor mass productivity.

The temperature for firing the granulated material can be appropriately selected according to the composition of a desired titanate compound, but it is preferably in a range of 650 to 1000° C. and more preferably in a range of 800 to 950° C. The firing time is preferably 0.5 to 8 hours and more preferably 2 to 6 hours.

The source of titanium is titanium dioxide or a compound which produces titanium dioxide when fired. No particular limitation is placed on the compound which produces titanium dioxide when fired, so long as it is a source material containing elemental titanium and not inhibiting the production of titanium dioxide by firing. Examples include compounds that can be converted to titanium dioxide when fired in air. Examples of such compounds include orthotitanic acid and its salts, metatitanic acid and its salts, titanium hydroxide, peroxotitanic acid and its salts. These sources of titanium may be used singly or in combination of two or more thereof. Preferred among them is titanium dioxide. The preferred crystal system of titanium dioxide is in rutile or anatase form.

The source of alkali metal is an oxide of an alkali metal or a compound which produces an oxide of an alkali metal when fired. There is no particular limitation as to the compound which produces an oxide of an alkali metal when fired, so long as it is a source material containing an alkali metal and not inhibiting the production of an oxide of the alkali metal by firing. Examples include: alkali metal carbonates; alkali metal hydrogen carbonates; alkali metal hydroxides; alkali metal organic acid salts, such as alkali metal acetates; alkali metal sulfates; and alkali metal nitrates. These sources of alkali metal may be used singly or in combination of two or more thereof. Preferred among them are alkali metal carbonates.

The mixture ratio between the source of titanium and the source of alkali metal can be appropriately selected according to the composition of desired titanate compound particles.

The amount of titanate compound particles mixed into the rubber composition according to the present invention is preferably 1 to 200 parts by mass and more preferably 20 to 60 parts by mass, relative to 100 parts by mass of rubber component. By adjusting the amount of titanate compound particles within the above range, more excellent wet grip performance and wear resistance can be achieved.

The BET specific surface area of the silica particles in the rubber composition according to the present invention is 50 to 250 $m^2/g$, preferably 80 to 210 $m^2/g$, and more preferably 100 to 190 $m^2/g$. By adjusting the BET specific surface area within the above range, more excellent dispersibility, wet grip performance, and wear resistance can be achieved. The BET specific surface area of the silica particles can be measured in conformity with JIS 28830. The BET method refers to a method in which nitrogen gas whose occupied area has already been known is adsorbed on the surface of a sample powder particle and the specific surface area of the sample powder particle is determined from the amount of nitrogen gas adsorbed thereon, and the specific surface area determined by this method refers to the "BET specific surface area".

Silica formed into the silica particles in the rubber composition according to the present invention refers not only to narrow-sense silicon dioxide but also to a silicate-based filler and can be used by appropriate selection from among silicas conventionally used as reinforcing fillers. Examples include wet silica (hydrous silicic acid) and dry silica (anhydrous silica). Preferred among them is wet silica in light of further increasing productivity, wet grip performance, and wear resistance. These types of silica may be used singly or in combination of two or more thereof. In addition, for the purpose of further increasing affinity with the rubber component, a treated layer made of a surface treatment agent is preferably formed on the surface of each of the silica particles. The types of the surface treatment agent that can be used are the same as those listed in the description of the titanate compound particles. Furthermore, also as for the method for forming the treated layers made of a surface treatment agent, the same methods as in the case of the titanate compound particles can be used.

In light of further increasing the productivity, wet grip performance, and wear resistance of a rubber composition to be obtained, the average secondary particle diameter of the silica particles is preferably 0.04 to 3 μm, more preferably 0.1 to 1 μm, and still more preferably 0.2 to 0.7 μm. The average secondary particle diameter of the silica particles can be measured by the laser diffraction and scattering method and is a particle diameter at a cumulative integrated value of 50% in a particle size distribution measured by the laser diffraction and scattering method (a volume-based 50% cumulative particle diameter), i.e., $D_{50}$ (a median diameter). This volume-based 50% cumulative particle diameter ($D_{50}$) is a particle diameter at a cumulative value of 50% in a cumulative curve of a particle size distribution determined on a volume basis, the cumulative curve assuming the total volume of particles to be 100%, where during accumulation the number of particles is counted from a smaller size side.

The amount of silica particles mixed into the rubber composition according to the present invention is preferably 20 to 120 parts by mass, more preferably 25 to 100 parts by mass, and still more preferably 30 to 90 parts by mass, relative to 100 parts by mass of rubber component. By adjusting the amount of silica particles within the above range, more excellent wet grip performance and wear resistance can be achieved.

In the rubber composition according to the present invention, the rubber component may be further mixed with carbon black particles in light of further increasing wear resistance.

In light of further increasing the dispersibility, mechanical strength, and hardness, the BET specific surface area of the carbon black particles is preferably 20 to 160 $m^2/g$, more preferably 40 to 130 $m^2/g$, and still more preferably 50 to 120 $m^2/g$. The BET specific surface area of the carbon black particles can be measured in conformity with JIS 28830. The BET method refers to a method in which nitrogen gas whose occupied area has already been known is adsorbed on the surface of a sample powder particle and the specific surface area of the sample powder particle is determined from the amount of nitrogen gas adsorbed thereon, and the specific surface area determined by this method refers to the "BET specific surface area".

In light of further increasing the dispersibility, mechanical strength, and hardness, the average secondary particle diameter of the carbon black particles is preferably 0.05 to 3 μm, more preferably 0.1 to 1.0 μm, and still more preferably 0.2 to 0.9 μm. The average secondary particle diameter of the carbon black particles can be measured by the laser diffraction and scattering method and is a particle diameter at a cumulative integrated value of 50% in a particle size distribution measured by the laser diffraction and scattering method (a volume-based 50% cumulative particle diameter), i.e., $D_{50}$ (a median diameter). This volume-based 50% cumulative particle diameter ($D_{50}$) is a particle diameter at a cumulative value of 50% in a cumulative curve of a particle size distribution determined on a volume basis, the cumulative curve assuming the total volume of particles to be 100%, where during accumulation the number of particles is counted from a smaller size side.

Examples of carbon black formed into the carbon black particles include furnace black, thermal black, acetylene black, and Ketjenblack. Preferred among them is furnace black in light of further increasing the mechanical strength of the rubber composition. These types of carbon black may be used singly or in combination of two or more thereof. In addition, for the purpose of further increasing affinity with the rubber component, the surfaces of the carbon black particles may be organically treated.

In the case where the rubber composition according to the present invention contains carbon black particles, the amount of carbon black particles mixed is preferably 2 to 50 parts by mass, more preferably 3 to 30 parts by mass, and still more preferably 10 to 20 parts by mass, relative to 100 parts by mass of rubber component.

The rubber composition according to the present invention may contain, as a reinforcing filler, calcium carbonate ($CaCO_3$), alumina ($Al_2O_3$), alumina hydrate ($Al_2O_3.H_2O$), aluminum hydroxide [$Al(OH)_3$], aluminum carbonate [$Al_2(CO_3)_3$], magnesium hydroxide [$Mg(OH)_2$], magnesium oxide (MgO), magnesium carbonate ($MgCO_3$), talc ($3MgO.4SiO_2.H_2O$), attapulgite ($5MgO.8SiO_2.9H_2O$), titanium white ($TiO_2$), titanium black ($TiO_{2n-1}$), calcium oxide (CaO), calcium hydroxide [$Ca(OH)_2$], magnesium aluminum oxide ($MgO.Al_2O_3$)$_r$, clay ($Al_2O_3.2SiO_2$), kaolin ($Al_2O_3.2SiO_2.2H_2O$), pyrophyllite ($Al_2O_3.4SiO_2.H_2O$), bentonite ($Al_2O_3.4SiO_2.2H_2O$), aluminum silicate (such as $Al_2SiO_5$ and $Al_4.3SiO_4.5H_2O$), magnesium silicate (such as $Mg_2SiO_4$ and $MgSiO_3$), calcium silicate (such as $Ca_2.SiO_4$), aluminum calcium silicate (such as $Al_2O_3.CaO.2SiO_2$), calcium magnesium silicate (CaMgSiO$_4$), zirconium oxide (ZrO$_2$), zirconium hydroxide [ZrO(OH)$_2$.nH$_2$O], zirconium carbonate [Zr(CO$_3$)$_2$], zinc acrylate, zinc methacrylate, or a crystalline aluminosilicate that contains hydrogen, an alkali metal or an alkaline earth metal capable of charge correction, such as various types of zeolites. These reinforcing fillers can be used singly or in a mixture of two or more thereof. The total amount of reinforcing fillers mixed is preferably 5 to 200 parts by mass and more preferably 30 to 100 parts by mass, relative to 100 parts by mass of rubber component.

The rubber composition according to the present invention can appropriately contain, in addition to the above components, compounding ingredients, such as a vulcanizing agent, a vulcanization accelerator, a vulcanization accelerator activator, an antioxidant, a softener, a plasticizer, a scorch retarder, an antiozonant, a foaming agent, and a vulcanization retarder, as commonly used in the rubber industrial field.

The vulcanizing agent that can be mixed is an organic peroxide or a sulfur-based vulcanizing agent. Examples of the organic peroxide that can be mixed include benzoyl peroxide, dicumyl peroxide, di-t-butyl peroxide, t-butyl cumyl peroxide, methyl ethyl ketone peroxide, cumene hydroperoxide, 2,5-dimethyl-2,5-di (t-butylperoxy) hexane, 2,5-dimethyl-2,5-di (benzoylperoxy) hexane, 2,5-dimethyl-2,5-di (t-butylperoxy) hexyne-3,1,3-bis (t-butylperoxypropyl) benzene, di-t-butylperoxy-diisopropylbenzene, t-butylperoxybenzene, 2,4-dichlorobenzoylperoxide, 1,1-di-t-butylperoxy-3,3,5-trimethylsiloxane, and n-butyl-4,4-di-t-butylperoxyvalerate. Preferred among these organic peroxides are dicumyl peroxide, t-butylperoxybenzene, and di-t-butylperoxy-diisopropylbenzene. Examples of the sulfur-based vulcanizing agent that can be mixed include sulfur and morpholine disulfide. Sulfur is preferred among the above sulfur-based vulcanizing agents.

Examples of the vulcanization accelerator that can be mixed include sulfenamide-based, thiazole-based, thiuram-based, thiourea-based, guanidine-based, dithiocarbamate-based, aldehyde-amine-based, and aldehyde-ammonia-based vulcanization accelerators.

Examples of the sulfenamide-based vulcanization accelerator includes sulfenamide-based compounds, such as CBS (N-cyclohexyl-2-benzothiazyl sulfenamide), TBBS (N-t-butyl-2-benzothiazyl sulfenamide), N,N-dicyclohexyl-2-benzothiazyl sulfenamide, N-oxydiethylene-2-benzothiazyl sulfenamide, and N,N-diisopropyl-2-benzothiazole sulfenamide.

Examples of the thiazole-based vulcanization accelerator include: MBT (2-mercaptobenzothiazole); MBTS (dibenzothiazyl disulfide); sodium salts, zinc salts, copper salts, and cyclohexylamine salts of 2-mercaptobenzothiazole; 2-(2,4-dinitrophenyl)mercaptobenzothiazole; and 2-(2,6-diethyl-4-morpholinothio)benzothiazole.

Examples of the thiuram-based vulcanization accelerator include TMTD (tetramethylthiuram disulfide), tetraethylthiuram disulfide, tetramethylthiuram monosulfide, dipentamethylenethiuram disulfide, dipentamethylenethiuram monosulfide, dipentamethylenethiuram tetrasulfide, dipentamethylenethiuram hexasulfide, tetrabutylthiuram disulfide, and pentamethylenethiuram tetrasulfide.

Examples of the thiourea-based vulcanization accelerator include thiourea-based compounds, such as thiocarbamide, diethylthiourea, dibutylthiourea, trimethylthiourea, and diorthotolylthiourea.

Examples of the guanidine-based vulcanization accelerator include guanidine-based compounds, such as diphenylguanidine, diorthotolylguanidine, triphenylguanidine, orthotolylbiguanide, and diphenylguanidine phthalate.

Examples of the dithiocarbamate-based vulcanization accelerator include dithiocarbamate-based compounds, such as zinc ethylphenyldithiocarbamate, zinc butylphenyldithiocarbamate, sodium dimethyldithiocarbamate, zinc dimethyldithiocarbamate, zinc diethyldithiocarbamate, zinc dibutyldithiocarbamate, zinc diamyldithiocarbamate, zinc dipropyldithiocarbamate, complex salt of zinc pentamethylenedithiocarbamate and piperidine, zinc hexadecylisopropyldithiocarbamate, zinc octadecylisopropyldithiocarbamate, zinc dibenzyldithiocarbamate, sodium diethyldithiocarbamate, piperidine pentamethylenedithiocarbamate, selenium dimethyldithiocarbamate, tellurium diethyldithiocarbamate, and cadmium diamyldithiocarbamate.

Examples of the aldehyde-amine-based and aldehyde-ammonia-based vulcanization accelerator include acetaldehyde-aniline reactants, butylaldehyde-aniline condensates, hexamethylenetetramine, and acetaldehyde-ammonia reactants.

Examples of the vulcanization accelerator activator that can be mixed include stearic acid and zinc flower (zinc oxide).

Examples of the antioxidant that can be mixed include amine-based, phenol-based, and imidazole-based compounds, carbamic acid metal salts, and wax.

Examples of the softener that can be mixed include: petroleum-based softeners, such as process oil, lubricating oil, paraffin, liquid paraffin, petroleum asphalt, and vaseline; fatty oil-based softeners, such as castor oil, linseed oil, rape seed oil, and palm oil; waxes, such as tall oil, factices, beeswax, carnauba wax, and lanolin; and fatty acids, such as linolic acid, palmitic acid, stearic acid, and lauric acid. By mixing the softener into the rubber composition, kneadability can be further increased.

Examples of the plasticizer that can be mixed include DMP (dimethyl phthalate), DEP (diethyl phthalate), DBP (dibutyl phthalate), DHP (diheptyl phthalate), DOP (dioctyl phthalate), DINP (diisononyl phthalate), DIDP (diisodecyl phthalate), BBP (butyl benzyl phthalate), DLP (dilauryl phthalate), DCHP (dicyclohexyl phthalate), anhydrous hydrophthalate ester, DOZ (di-2-ethylhexyl azelate), DBS (dibutyl sebacate), DOS (dioctyl sebacate), acetyl triethyl citrate, acetyl tributyl citrate, DBM (dibutyl maleate), DOM (2-ethyl hexyl maleate), and DBF (dibutyl fumarate).

Examples of the scorch retarder that can be mixed include: organic acids, such as phthalic anhydride, salicylic acid, and benzoic acid; nitroso compounds, such as N-nitrosodiphenylamine; and N-cyclohexylthiophthalimide.

The rubber composition according to the present invention can be produced using known methods, can be obtained by kneading the above compounding ingredients with a kneader, for example, an open kneader, such as a roll, or a closed kneader, such as a Banbury mixer, and can be applied to various rubber products by vulcanizing it, for example, at 140 to 190° C. for 5 to 40 minutes after being subjected to molding process.

The rubber composition according to the present invention can be used particularly for tire, i.e., for various portions thereof, such as tire tread, undertread, carcass, sidewall, and bead portions. The rubber composition can be suitably used as rubber for, among the above portions, a tire tread because it can provide more excellent wet grip performance and wear resistance.

A tire according to the present invention has a feature in that the above-described rubber composition according to the present invention is used for a tread portion, and thus has excellent wet grip performance and wear resistance. There is no particular limitation as to the tire according to the present invention so long as the above rubber composition according to the present invention is used for a tread portion, and the tire can be appropriately formed according to an ordinary method.

EXAMPLES

The present invention will be described below in further detail with reference to specific examples. The present invention is not at all limited by the following examples and modifications and variations may be appropriately made therein without changing the gist of the invention.

Examples 1 to 7 and Comparative Examples 1 to 4

Components described in Table 1 below, but exclusive of vulcanization accelerators and sulfur, were kneaded in a 1.5-L closed mixer for three to five minutes and the resultant master batch was released from the mixer when reaching 140 to 170° C. The vulcanization accelerators and sulfur were added to the master batch at a ratio described in Table 1 below, followed by kneading with a 10-inch open roll, thus obtaining a composition. The composition was press vulcanized at 150° C. in a mold for 40 minutes, thus producing a test sample of a desired rubber composition.

Respective fillers used for the rubber compositions were those having composition formulas and average particle diameters described in Table 2 below. As shown in Table 2, Fillers A to G were non-fibrous titanate compound particles. The average particle diameter was measured with a laser diffraction particle size distribution measurement device (product number "SALD-2100" manufactured by Shimadzu Corporation), the BET specific surface area was measured in conformity with JIS Z8830, the packed specific gravity was measured with a powder characteristics tester (product number "Powder Tester PT-S" manufactured by Hosokawa Micron Corporation), and the aqueous dispersion pH was obtained by adding 1 g of a sample into 100 mL of distilled water to prepare a slurry and measuring the prepared slurry in terms of pH (at a temperature of 20° C.) with a pH meter (product number "F21" manufactured by Horiba, Ltd.

The following components were used as components other than the filler described in Table 1.

SBR (styrene-butadiene rubber): product name "Tufdene 2000R" manufactured by Asahi Kasei Corporation, BR (butadiene rubber): product name "BR 150B" manufactured by Ube Industries, Ltd., Silane coupling agent: bis[3-(triethoxysilyl)propyl] tetrasulfide, product name "Si 69" manufactured by Evonik Industries AG, Stearic acid: manufactured by Sichuan Tianyu Grease Chemical Co., Ltd., Zinc oxide: manufactured by Sakai Chemical Industry Co., Ltd., Antioxidant: product name "Antage 6C" manufactured by Kawaguchi Chemical Industry Co., Ltd., Vulcanization accelerator 1: product name "Nocceler CZ-G" manufactured by Ouchi Shinko Chemical Industrial Co., Ltd., Vulcanization accelerator 2: product name "Nocceler D" manufactured by Ouchi Shinko Chemical Industrial Co., Ltd., and Sulfur: product name "HK200-5" manufactured by Hosoi Chemical Industry Co., Ltd.

Production Example 1: Filler B

Titanium dioxide and potassium carbonate weighed to be Ti:K=3:1 (molar ratio) were mixed for ten minutes while being ground in a vibration mill. The obtained ground mixture was dry granulated in a high-speed mixer and then fired at 850° C. in an electric furnace for four hours, thus obtaining a powder.

The obtained powder was confirmed to be $K_2Ti_6O_{13}$ in a single phase, using an X-ray diffraction measurement device (product name "Ultima IV" manufactured by Rigaku Corporation). The average particle diameter was measured with a laser diffraction particle size distribution measurement device (product number "SALD-2100" manufactured by Shimadzu Corporation), the BET specific surface area was measured in conformity with JIS Z8830, the packed specific gravity was measured with a powder characteristics tester (product number "Powder Tester PT-S" manufactured by Hosokawa Micron Corporation), and the aqueous dispersion pH was obtained by adding 1 g of a sample into 100 mL of distilled water to prepare a slurry and measuring the prepared slurry in terms of pH (at a temperature of 20° C.) with a pH meter (product number "F21" manufactured by Horiba, Ltd. The results are shown in Table 2 below.

The shape of the obtained powder was confirmed to be non-fibrous particles having fine gaps of less than 1 μm between fine particles, using a field-emission scanning electron microscope (SEM, product number "S-4800" manufactured by Hitachi High-Technologies Corporation). FIG. 1 shows a SEM photograph of the whole of a particle.

As for pores of the obtained powder, the cumulative pore volume within a pore diameter range of 0.01 to 1.0 μm was 21.1% and the maximum value in the pore distribution was 0.11 μm.

Production Example 2: Filler A

Filler B obtained in Production Example 1 was dry ground in a vibration mill and the obtained ground product was classified by an elutriation classification technique, thus obtaining a powder. The shape of Filler A thus obtained was confirmed to be non-fibrous particles using SEM. FIG. 2 shows a SEM photograph of the whole of a particle. Filler A was measured in terms of average particle diameter, BET specific surface area, packed specific gravity, and aqueous dispersion pH. The results are shown in Table 2 below.

Production Example 3: Filler E

Filler C (product name "TERRACESS TF-SS) manufactured by Otsuka Chemical Co., Ltd.) was surface treated with a 2-propanol solution of a coupling agent A (3-aminopropyltriethoxysilane, product name "KB-903" manufactured by Shin-Etsu Chemical Co., Ltd.), thus obtaining a powder. The surface treatment was performed so that the amount of surface treatment agent reaches 1 part by mass relative to 100 parts by mass of Filler C.

The obtained powder was measured in terms of average particle diameter, BET specific surface area, packed specific gravity, and aqueous dispersion pH. The results are shown in Table 2 below.

Production Example 4: Filler F

Filler C was surface treated with a 2-propanol solution of a coupling agent B (isopropyltri(N-aminoethyl-aminoethyl) titanate, product name "Plenact KR44" manufactured by Ajinomoto Fine-Techno Co., Inc.), thus obtaining a powder.

The surface treatment was performed so that the amount of surface treatment agent reaches 1 part by mass relative to 100 parts by mass of Filler C.

The obtained powder was measured in terms of average particle diameter, BET specific surface area, packed specific gravity, and aqueous dispersion pH. The results are shown in Table 2 below.

Production Example 5: Filler G

Filler C was surface treated with a 2-propanol solution of a coupling agent C (acetoalkoxyaluminum diisopropylate, product name "Plenact AL-M" manufactured by Ajinomoto Fine-Techno Co., Inc.), thus obtaining a powder. The surface treatment was performed so that the amount of surface treatment agent reaches 1 part by mass relative to 100 parts by mass of Filler C.

The obtained powder was measured in terms of average particle diameter, BET specific surface area, packed specific gravity, and aqueous dispersion pH. The results are shown in Table 2 below.

[Evaluations]

The test samples of rubber compositions obtained in Examples 1 to 7 and Comparative Examples 1 to 4 were evaluated according to the following evaluation methods. The results are shown in Table 1 below.

(Evaluation Methods)

1) Wet Grip Performance

The wet grip performance was measured under a condition of room temperature (25° C.) using a British Pendulum Skid Tester and expressed as an index with 100 representing the wet grip performance of Comparative Example 4. A larger value indicates more excellent wet grip performance.

2) Wear Resistance

The evaluation in terms of wear resistance was conducted under conditions of room temperature and a slip ratio of 24% according to a Lambourn abrasion test (JIS K6264). The index of wear resistance was calculated, using as a reference the rubber composition produced in Comparative Example 4, based on the following formula. A larger value of the wear resistance index indicates more excellent wear resistance.

Wear resistance index={(amount of wear of rubber composition in Comparative Example 4)/ (amount of wear of each test sample of rubber composition)}×100    Formula:

3) Dispersibility of Filler

The test samples for measuring wet grip performance were observed with SEM and their dispersibility was evaluated based on the following evaluation criteria.

[Evaluation Criteria]

Good: The test sample had no defectively dispersed filler lump and the filler was therefore in a well dispersed state.

Fair: The test sample had some defectively dispersed filler lumps.

Poor: Defectively dispersed filler lumps were conspicuous and the filler was therefore apparently in a poorly dispersed state.

TABLE 1

| | | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 |
|---|---|---|---|---|---|---|---|---|---|---|---|---|
| Amount Contained (parts by mass) | SBR | 80 | 80 | 80 | 80 | 80 | 80 | 80 | 80 | 80 | 80 | 80 |
| | BR | 20 | 20 | 20 | 20 | 20 | 20 | 20 | 20 | 20 | 20 | 20 |
| | Silica | 30 | 30 | 30 | 30 | 30 | 30 | 30 | 30 | 30 | | 50 |
| | Carbon black | 4 | 4 | 4 | 4 | 4 | 4 | 4 | 4 | 4 | 30 | 4 |
| | Filler A | 20 | | | | | | | | | 20 | |
| | Filler B | | 20 | | | | | | | | | |
| | Filler C | | | 20 | | | | | | | | |
| | Filler D | | | | 20 | | | | | | | |
| | Filler E | | | | | 20 | | | | | | |
| | Filler F | | | | | | 20 | | | | | |
| | Filler G | | | | | | | 20 | | | | |
| | Potassium titanate fibers | | | | | | | | 20 | | | |
| | Titanium dioxide | | | | | | | | | 20 | | |
| | Silane coupling agent | 4 | 4 | 4 | 4 | 4 | 4 | 4 | 4 | 4 | 1.6 | 4 |
| | Stearic acid | 2 | 2 | 2 | 2 | 2 | 2 | 2 | 2 | 2 | 2 | 2 |
| | Zinc oxide | 2 | 2 | 2 | 2 | 2 | 2 | 2 | 2 | 2 | 2 | 2 |
| | Antioxidant | 5 | 5 | 5 | 5 | 5 | 5 | 5 | 5 | 5 | 5 | 5 |
| | Vulcanization acc. 1 | 1.5 | 1.5 | 1.5 | 1.5 | 1.5 | 1.5 | 1.5 | 1.5 | 1.5 | 1.5 | 1.5 |
| | Vulcanization acc. 2 | 2 | 2 | 2 | 2 | 2 | 2 | 2 | 2 | 2 | 2 | 2 |
| | Sulfur | 1.5 | 1.5 | 1.5 | 1.5 | 1.5 | 1.5 | 1.5 | 1.5 | 1.5 | 1.5 | 1.5 |
| Evaluation Results | Wet grip index | 107 | 108 | 110 | 112 | 107 | 108 | 109 | 103 | 102 | 89 | 100 |
| | Wear resistance index | 104 | 103 | 105 | 103 | 111 | 112 | 109 | 89 | 92 | 102 | 100 |
| | Filler dispersibility | Good | Fair | Fair | Fair | Good | Good | Good | Poor | Good | Good | Fair |

TABLE 2

| | Manufacturer | Product Name | Comps. Formula | Particle Shape | Average Particle Diameter [μm] | BET SSA [m$^2$/g] | Packed SG [g/cm$^3$] | Aqueous Dispersion pH |
|---|---|---|---|---|---|---|---|---|
| Filler A | Prod. Ex. 2 | — | $K_2Ti_6O_{13}$ | non-fibrous | 0.8 | 7.9 | 1.0 | 9.7 |
| Filler B | Prod. Ex. 1 | — | $K_2Ti_6O_{13}$ | non-fibrous | 24.4 | 6.0 | 0.9 | 10.0 |
| Filler C | Otsuka Chemical | TERRACESS TF-SS | $K_2Ti_8O_{17}$ | non-fibrous | 3.3 | 3.9 | 1.0 | 9.2 |
| Filler D | Otsuka Chemical | TERRACESS TF-L | $K_2Ti_8O_{17}$ | non-fibrous | 26.6 | 2.4 | 1.4 | 9.6 |

TABLE 2-continued

| | Manufacturer | Product Name | Comps. Formula | Particle Shape | Average Particle Diameter [μm] | BET SSA [m$^2$/g] | Packed SG [g/cm$^3$] | Aqueous Dispersion pH |
|---|---|---|---|---|---|---|---|---|
| Filler E | Prod. Ex. 3 | Product of Filler C treated with Coupling agent A | $K_2Ti_8O_{17}$ | non-fibrous | 3.6 | 3.5 | 1.1 | 9.8 |
| Filler F | Prod. Ex. 4 | Product of Filler C treated with Coupling agent B | $K_2Ti_8O_{17}$ | non-fibrous | 3.2 | 2.9 | 1.1 | 9.6 |
| Filler G | Prod. Ex. 5 | Product of Filler C treated with Coupling agent C | $K_2Ti_8O_{17}$ | non-fibrous | 3.0 | 3.1 | 1.1 | 9.4 |
| Potassium titanate fibers | Otsuka Chemical | TISMO N | $K_2Ti_6O_{13}$ | fibrous | Fiber length 10-20 μm, Fiber diameter 0.3-0.6 μm | 5.0 | 0.2 | 7.5 |
| Titanium dioxide | Wako (reagent) | Titanium oxide in anatase form | $TiO_2$ | non-fibrous | 0.6 | 7.0 | 0.9 | 8.0 |
| Carbon black | Tokai Carbon | Seast 3 | C | non-fibrous | 0.8 | 114.7 | 0.4 | 9.0 |
| Silica | Solvay | Zeosil 1165MP | $SiO_2$ | non-fibrous | 0.4 | 165 | 1.8 | 7.0 |

The invention claimed is:

1. A rubber composition containing a rubber component mixed with: non-fibrous titanate compound particles having an average particle diameter of less than 30 μm and a BET specific surface area of 2 m$^2$/g or more; and silica particles having a BET specific surface area of 50 to 250 m$^2$/g, wherein a titanate compound formed into the non-fibrous titanate compound particles is at least one selected from a compound having a composition formula $A_2Ti_nO_{(2n+1)}$ [where A represents at least one metal selected from among alkali metals and n=2 to 8], a compound having a composition formula $R_xM_yTi_{(2-y)}O_4$ [where R represents an alkali metal other than lithium, M represents at least one element selected from lithium, magnesium, zinc, nickel, copper, iron, aluminum, gallium, and manganese, x=0.5 to 1.0, and y=0.25 to 1.0], a compound having a composition formula $K_{0.5-0.8}Li_{0.27}Ti_{1.73}O_{3.85-3.95}$, and a compound having a composition formula $K_{0.2-0.8}Mg_{0.4}Ti_{1.6}O_{3.7-3.95}$.

2. The rubber composition according to claim 1, wherein a treated layer made of a surface treatment agent is provided on a surface of each of the non-fibrous titanate compound particles.

3. The rubber composition according to claim 1, wherein the rubber component is a diene rubber.

4. The rubber composition according to claim 1, wherein an amount of the non-fibrous titanate compound particles mixed is 1 to 200 parts by mass relative to 100 parts by mass of the rubber component.

5. The rubber composition according to claim 1, wherein an amount of the silica particles mixed is 20 to 120 parts by mass relative to 100 parts by mass of the rubber component.

6. The rubber composition according to claim 1, wherein the rubber component is further mixed with carbon black particles.

7. The rubber composition according to claim 1, being for use in a tire tread.

8. A tire having a tread portion in which the rubber composition according to claim 1 is used.

* * * * *